June 9, 1931. W. FENDRICH, JR 1,809,197
METHOD OF PRODUCTION OF GENERATOR ARMATURES
Filed Aug. 6, 1929

Inventor
WILLIAM FENDRICH JR.
per Harold Dodd
Attorney

Patented June 9, 1931

1,809,197

UNITED STATES PATENT OFFICE

WILLIAM FENDRICH, JR., OF UPPER MONTCLAIR, NEW JERSEY

METHOD OF PRODUCTION OF GENERATOR ARMATURES

Application filed August 6, 1929. Serial No. 383,841.

(GRANTED UNDER THE ACT OF MARCH 3, 1883, AS AMENDED APRIL 30, 1928; 370 O. G. 757)

My invention relates broadly to constant voltage generators and more particularly to the production of armatures in which the permeability is substantially uniform throughout 360 degrees of revolution thereof.

An object of my invention is to produce a generator armature the voltage graph of which is a symmetrical curve.

In generators used in the past for the generation of alternating or direct current there has been present in the voltage variation in the voltage, which heretofore has not been explained and which has not been remedied although many attempts have been made to eliminate these variations.

In generators of the alternating current type these variations have been termed harmonics and in direct current generators and primarily those which have been used for the production of high direct current voltages for use on the plates of vacuum power tubes these variations have been termed ripples. It was in this use that the ripples were discovered by use of the oscillograph.

In studying these harmonics and ripples as shown by the oscillograph I have discovered that they are due to the irregular permeability of the metal forming the armature. To the end that these harmonics and ripples may be eliminated I have developed the following method in connection with the production of an armature by which the resultant armature will give a voltage the graph of which will be a pure sine curve in the case of an alternating current generator or a straight line curve in the case of the direct current generator.

With the above and other objects in view the invention consists in the construction, combination and arrangement of parts as will be described more fully hereinafter.

Figure 1:
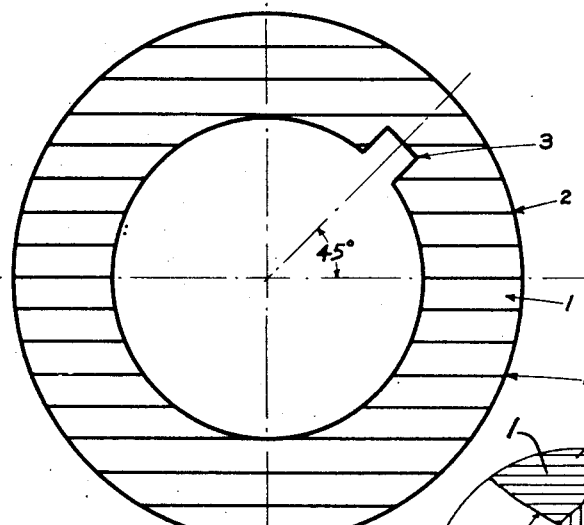
Figure 3:
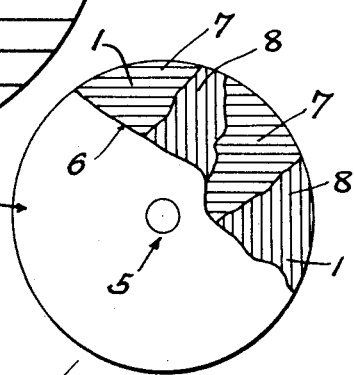
Figure 2:
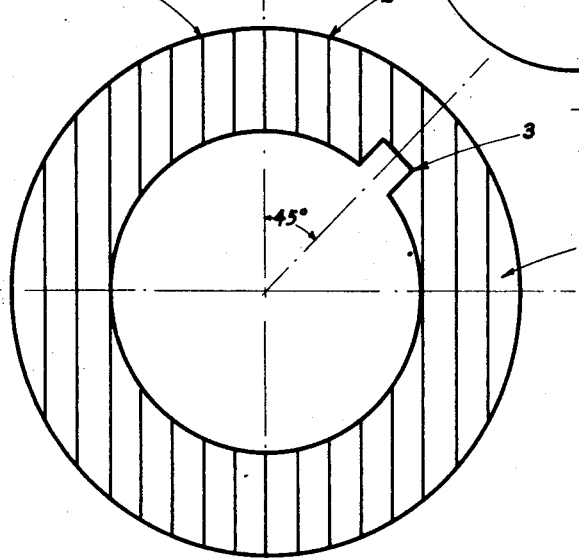

Reference is to be had to the accompanying drawings forming a part of this specification, in which like reference characters indicate corresponding parts through the several views, and in which Figure 1 is a view of one of the plates of my improved armature, Figure 2 is a view of an adjacent plate in my improved armature, and Fig. 3 is a view of an armature partly broken away to show the alternate plates thereof assembled in accordance with this invention.

Referring to the drawings, numeral 1 designates the "grain" of the metal. Numeral 3 designates a keyway for the shaft upon which the individual plates 2 are mounted or in the case of a generator in which there is a stationary armature and a rotating field this keyway, either on the inside of the plate or upon the periphery thereof serves as an aligning means and as a recess for holding clamping means for holding the plates together.

Numeral 4 designates an armature having its shaft at 5 and its shell at 6. This shell 6 is partly broken away and shows some of the alternate plates, likewise partly broken away, the plates 7 having their grain 1 running at right angles to the grain 1 in plates 8.

I have established through many experiments that the permeability of these plates, punched from sheet metal, is lower along the direction of the "grain" of the metal than along any other direction edgewise of the plate and an armature made up as ordinarily practiced with the grain of the individual plates in the same direction has lower permeability in one direction than in others so that the resultant voltage generated thereby contains ripples or harmonics. It is therefore the subject of my invention to so arrange the individual plates of an armature that the components of the line of low permeability progress around the armature with the result that the armature as a whole will have the same permeability throughout 360 degrees of its rotation.

In sheet metal the "grain" of the metal runs substantially the same direction on each sheet, that is lengthwise of the sheet as rolled from a bar of stock metal. From this regularity in the "grain" of the sheet it will be seen from Figures 1 and 2 that if the punch is so positioned relative to the feed board of the punch press that the key-way 3 makes an angle of 45 degrees with the center line of the plate, which is parallel with the "grain" of the metal, then by turning over each alternate plate and rotating the same until the key-way is in the same position as the first plate, the plates will be arranged as shown in Figures 1 and 2, with the "grain" of the metal at right angles in alternate plates. When these plates are assembled together in this manner the resultant armature is one which will generate current the voltage graph of which is a pure curve without ripples or harmonics.

From the foregoing description of the method by which I produce my improved armatures it will be seen that I have produced a method of manufacture of armatures, the permeability of which is substantially uniform throughout 360 degrees of rotation thereof, and which is simple and expeditious to quantity production.

It will be understood that the above description and accompanying drawings comprehend only the general and preferred embodiment of my invention and that various changes in details of construction, proportion and arrangement of parts may be made within the scope of the appended claims and without sacrificing any of the advantages of my invention.

The invention described herein may be manufacture and used by or for the Government of the United States for governmental purposes without the payment to me of any royalty thereon.

Having described my invention what I claim is:

1. The method of producing an armature of substantially uniform permeability which consists of aligning a sheet of metal with the grain in a predetermined position relative to the bed of a punch press, aligning the die and punch with the keyway of said die and punch at an angle to the grain of the metal, punching a series of plates from said sheet metal, reversing alternate plates of said series and fixing said series upon a shaft.

2. The method of producing an armature of substantially uniform permeability which consists of aligning a sheet of metal with the grain in a predetermined position relative to the bed of a punch press, aligning the die and punch with the keyway of said die and punch at an angle of substantially 45 degrees to the grain of said metal sheet, punching a series of plates from said sheet metal, reversing alternate plates of said series and fixing said series upon a shaft.

3. The method of producing an armature of substantially uniform permeability which consists in aligning a sheet of metal with the grain in a predetermined position relative to the bed of a punch press, aligning the die and punch with the keyway of said die and punch at an angle to the grain of said metal sheet, punching a series of plates from said metal sheet, reversing alternate plates of said series, rotating the reversed plates until the keyways of the alternate plates are in alignment with the keyways in the remaining plates, placing said series upon a shaft and fixing the same thereto.

4. The method of producing an armature of substantially uniform permeability which consists in punching a series of plates from sheet metal, and arranging said plates upon a shaft with the grain of each alternate plate at a predetermined angle to the grain of the metal of the adjacent plate.

5. The method of producing an armature, of substantially uniform permeability which consists in punching a series of plates from sheet metal, reversing alternate plates of said series, rotating said reversed plates until the grain of said plates are at a predetermined angle to the original plates and fixing said series upon a shaft.

6. The method of producing an armature, of substantially uniform permeability which consists in punching a series of plates from sheet metal, reversing alternate plates of said series, rotating said reversed plates until the grain of said reversed plates are at an angle of substantially 90 degrees with the grain of said original plates and fixing said series upon a shaft in this relative position.

7. In an armature of substantially uniform permeability the combination of a series of plates stamped from sheet metal, the grain of each alternate plate being at an angle to the remaining plates of the series.

8. In an armature of substantially uniform permeability the combination of a series of plates stamped from sheet metal, the grain of each alternate plate being at an angle of 90 degrees to the remaining plates of said series.

9. In an armature of substantially uniform permeability, the combination of a series of plates stamped from sheet metal, each alternate plate having been reversed and rotated so that the grain of each alternate plate is at a predetermined angle to the remaining plates of said series.

10. In an armature of substantially uniform permeability the combination of a series of plates stamped from sheet metal, each alternate plate having been reversed and rotated so that the grain of each alternate plate is at an angle of substantially 90 degrees to the grain of the remaining plates of said series.

11. In an armature of substantially uniform permeability the combination of a series of plates stamped from sheet metal, each plate having a hole for a shaft and means for keying said plate to said shaft, said means being at a predetermined angle to the grain of said plate, each plate having been reversed and rotated until the means for keying said plates to said shaft coincide and means for fastening said plates upon said shaft.

12. In an armature of substantially uniform permeability the combination of a series of plates stamped from sheet metal, each plate having a hole for a shaft and means for keying said plate to said shaft, said means being at an angle of 45 degrees to the grain of said plate, each plate having been reversed and rotated until the means for keying said plates to said shaft coincide and means for fastening said plates upon said shaft.

13. In an armature of substantially uniform permeability the combination of a series of plates stamped from sheet metal, each plate having a hole therethrough for a shaft and a keyway in the circumference of said hole for keying said plate to said shaft, said keyway being at an angle to the grain of said plate, each plate having been reversed and rotated until the keyways in the individual plates coincide and means for fastening said plates upon a shaft.

14. In an armature of substantially uniform permeability the combination of a series of plates stamped from sheet metal, each plate having a hole therethrough for a shaft and a keyway in the circumference of said hole for keying said plate to said shaft, said keyway being at an angle of 45 degrees to the grain of said plate, each plate having been reversed and rotated until the keyways in the individual plates coincide and means for fastening said plates upon a shaft.

WM. FENDRICH, Jr.